Patented July 3, 1934

1,965,538

UNITED STATES PATENT OFFICE 1,965,538

POROUS MAGNESIA CEMENT

Leroy C. Stewart, Midland, Mich., assignor to The Dow Chemical Company, Midland, Mich., a corporation of Michigan No Drawing. Application April 27, 1932, Serial No. 607,895

12 Claims. (Cl. 106—29)

The present invention relates to porous cement mixtures, in particular, magnesia cement mixtures having a controllable degree of porosity. Such materials are adapted for a variety of uses, such as the manufacture of artificial stone for structural, decorative, heat-insulating or other purposes.

Many proposals have been made for forming porous plastic cement mixtures by incorporating in the cement mix a material which is capable of giving off a gas to act as a leavening or pore-forming agent. For example, substances like baking powder have been proposed, which depend upon the reaction of an acid compound upon a carbonate to evolve carbon dioxide. Other suggestions include the use of a finely divided metal, like aluminum or zinc, to react with an alkaline constituent of the cement to generate hydrogen gas.

The aforementioned methods, however, are inapplicable for use with magnesia cements, which are composed of magnesia, a soluble magnesium salt and water as the principal active constituents. The magnesia present therein is sufficiently alkaline to neutralize the acid component of a baking powder type of gas generating agent, while it is not a strong enough alkali to react with a metal such as aluminum or zinc to produce hydrogen gas. The addition of a stronger alkali to the cement mixture for the last-mentioned purpose would have a deleterious effect upon the strength of the cement.

According to the present invention, a porous magnesia cement mixture is produced by incorporating in the wet cement mix a suitable amount of finely divided magnesium or magnesium alloy. Such finely divided metal has the property of reacting in the presence of water and the magnesium salt to generate hydrogen gas gradually. A control of the volume and rate of gas evolution may be obtained by varying the amount of metallic powder added, or the fineness thereof, or the particular alloy chosen for the purpose. The invention, then, consists of the improved porous cement compositions, together with the methods of preparing the same, hereinafter fully described and pointed out in the claims.

In carrying out my invention I prepare a wet mix of a magnesium oxychloride or oxysulphate cement, and incorporate therein a relatively small amount of finely divided magnesium or magnesium alloy. The metallic particles react slowly with aqueous magnesium salt solution present in the mix to generate hydrogen gas. If desired, however, the metallic particles may be added to the dry constituents previous to wetting, in which case no substantial gas evolution will occur until the cement mixture is mixed with water.

Any composition for a magnesium oxychloride or oxysulphate cement may be employed, such as are well known in the art. For example, for an oxychloride cement, a mixture of from 10 to 40 parts of calcined magnesite and from 90 to 60 parts of an inert filler, such as sand, asbestos, sawdust, etc., is gaged with a 18° to 22° Bé. solution of magnesium chloride until a wet mix of suitable consistency for troweling or molding is prepared. In such mix is incorporated from about .05 to 2.0 per cent, based on weight of dry constituents, of finely divided magnesium or magnesium alloy. The mixture is then placed in suitable molds, or applied with a trowel to a wall or the like as a stucco or plaster. This type of cement takes an initial set within from 1 to 8 hours, depending upon composition and atmospheric conditions. In the meantime, while still in a more or less plastic state, gas bubbles are gradually evolved which form a multiplicity of voids or pores in the plastic mass.

In similar manner a porous product may be made from a magnesium oxysulphate cement containing magnesia, magnesium sulphate and water as active constituents, together with any suitable filler. In the case of the oxysulphate cements it may be advisable to add to the mix a small amount of a strengthener, such as a metallic phosphate or citrate, in accordance with the improvement disclosed in my prior Patents Nos. 1,853,521 and 1,853,522. To prepare the cement, a dry mixture of magnesia and a suitable filler, such as sand, asbestos, etc., is made up in proportions of about 10 to 40 parts of magnesia to from 90 to 60 parts of filler, and the whole gaged to a proper consistency with a magnesium sulphate solution of 22° to 32° Bé. strength. If a strengthener is used, it may conveniently be dissolved in the magnesium sulphate solution, in proportion of 0.5 to 3 per cent of the sulphate content thereof figured as $MgSO_4 \cdot 7H_2O$. The finely divided magnesium or magnesium alloy is incorporated in the wet mix in amount of .05 to 2.0 per cent of the solids therein. The action of the sulphate on the metal particles is somewhat slower than in the case of the chloride, but the effect is the same in producing a porous mass due to the generation of hydrogen gas therein.

The rate of gas generation, and hence the degree of porosity of the product, may be controlled by varying the amount and fineness of the metallic particles, and also the composition of the alloy used. Special effects may be secured by a partial or incomplete mixing of the metal particle into the plastic mass, thereby forming bands, streaks or layers of porous material interspersed within the whole mass. Considerable latitude is permissible in the amount of metallic particles added. About 1 to 2 per cent, based on the weight of dry solids, is sufficient to produce about the maximum porosity, according to which the volume of the hardened material may be increased by as much as 50 to 60 per cent over that of a similar cement to which no metallic particles have been added. On the other hand, I have prepared special artist's stone to resemble Travertine marble in which as low as .05 per cent of finely divided magnesium was added and mixed into certain portions only of the mass. An excess of metallic particles over the maximum amount stated above, however, is not harmful to the properties of the hardened cement, since the presence of free metallic particles in the hardened mass does not cause injury due to crumbling or disintegration thereof.

If a still greater increase in porosity is desired, this may be accomplished by adding an emulsifying agent along with the metallic particles. Such emulsifying agent acts as a gas-entraining agent to hinder or retard the escape of the gas bubbles formed within the plastic mass, and causes a greater swelling of the same. In this way the volume of the porous mass may be increased to as much as twice that of the cement itself without the addition of the metallic particles and emulsifier. As examples of such emulsifying agents glue, soaps, emulsified asphalt, flotation oils, and the like, may be mentioned. The precise identity of the agent is immaterial to the principle of the invention, inasmuch as any of the known materials may be employed, as desired.

Another means of further increasing the porosity of the hardened mass is to incorporate in the plastic cement mix an agent capable of retarding the setting of the cement, such as borax, zinc sulphate, cuprous chloride, or, in general, soluble salts of zinc, tin, cadmium, cobalt, etc. The cement mix so treated, by setting more slowly, is enabled to swell to a greater extent due to the continued generation of gas therein for a longer time. If desired, both a retarder and emulsifying agent may be employed together.

Considerable variation in the rate and amount of gas evolution may be effected by varying the size of the metallic particles. The smaller the particles, the more rapid is the evolution of gas. In general the size may vary from about 10 to 100 mesh according to the standard screen scale.

There is a wide range of alloy compositions which are suitable for the purposes of the invention. In fact, substantially any alloy containing about 5 to 10 per cent of magnesium or more may be used, although in general alloys containing upwards of 50 per cent magnesium will be preferred. Magnesium is known to alloy readily with most of the common metals except iron; specifically it alloys in all proportions with aluminum, copper, zinc, tin, lead, antimony, nickel and many other metals. In most cases such alloys are characterized by an eutectic type of structure which tends to cause brittleness, and hence aids in mechanically comminuting the metal. In some cases the addition of only a small percentage of magnesium to another metal produces an alloy which is much more susceptible to chemical action than either of the constituent metals. This is especially true in the case of alloys of magnesium with copper, nickel and lead. Reactive alloys of magnesium with these metals may be prepared in which the magnesium content varies from as high as 99 per cent to as low as 10 per cent, or even less. Over the greater part of this range the alloys are characteristically brittle, hence adapted for reducing to a comminuted condition according to the usual methods. These alloys are chemically more reactive than is pure magnesium. In alloys of magnesium with aluminum and zinc the tendency to brittleness is still present, but to a lesser degree, and a higher percentage of the alloying metal is required to produce a typically brittle alloy. Such last-mentioned alloys are in general less reactive than pure magnesium. It is apparent, therefore, that the general class of magnesium alloys containing a substantial proportion of magnesium, e.g. upwards of 10 per cent thereof, when in finely divided form, may be utilized in my invention, which is understood to include the addition to a plastic magnesia cement of finely divided particles of magnesium or of any magnesium alloy containing a substantial proportion of magnesium. Preferably, the alloys suitable for the purpose are those of magnesium with any one or more of the metals aluminum, copper, tin, zinc, nickel or lead.

As specific embodiments of my invention, the following illustrative examples are given, which, however, are not to be construed as limiting in any way the scope of the invention.

*Example 1*

To make a light, porous building block, a dry mix was prepared consisting of 40 parts by weight of plastic magnesia, 58 parts of granulated wood charcoal and 2 parts of asbestos, to which was added 0.5 to 1.0 per cent of finely divided magnesium. The mass was then gaged with a 22° Bé. magnesium chloride solution to a proper consistency for molding. The increase in volume of the set and hardened block formed therefrom was about 43 per cent as compared with the same mix to which no metallic particles were added.

*Example 2*

A dry mix was prepared consisting of 40 parts of magnesia, 58 parts of granulated charcoal and 2 parts of asbestos, with which was incorporated 6 parts of emulsified asphalt and 1 part of finely divided magnesium. It was then gaged with a 22° Bé. magnesium chloride solution to a molding consistency. The block formed therefrom after setting showed an increase in volume of 95 per cent over that obtained with the same mix from which the metallic particles and emulsifier were omitted.

*Example 3*

A dry mix the same as that in Example 2 was prepared, and gaged to a molding consistency with a 24° Bé. magnesium sulphate solution. The increase in volume of the hardened block was 55 per cent as compared with the check sample.

*Example 4*

A dry mix was prepared the same as in Example 2, except that 1 part of a finely divided alloy containing 65 per cent magnesium and 35 per cent aluminum was used as the metallic ingredient.

The mass was gaged with a 22° Bé. magnesium chloride solution to a molding consistency. The increase in volume of the hardened block was 47 per cent.

*Example 5*

To a dry mix consisting of 25 parts of magnesia, 65 parts of marble flour and 10 parts of powdered talc were added varying amounts of finely divided magnesium, as shown in the table, and the whole was gaged with a 22° Bé. magnesium chloride solution to a medium thin consistency. The tabulated results show the increase in volume of the hardened porous mass as compared with one to which no magnesium particles were added. In the table the percentage of magnesium is based upon the weight of the dry mix.

| Amount added | Size of particles | Increase in volume |
| --- | --- | --- |
| Percent | Mesh | Percent |
| 0.25 | 48 | 30 |
| 0.5 | 48 | 42 |
| 1.0 | 48 | 53 |
| 0.5 | 28–48 | 30 |

*Example 6*

The same dry mix as in Example 5 was used, with which was incorporated 0.5 per cent of 48-mesh particles of an alloy containing 65 per cent magnesium and 35 per cent aluminum, the whole being gaged to a medium consistency with a 22° Bé. magnesium chloride solution. The increase in volume of the porous mass was 30 per cent.

*Example 7*

The dry mix of Example 5 was mixed with 0.5 per cent of 48-mesh particles of magnesium, and the mass gaged with a 28° Bé. solution of magnesium sulphate containing 0.5 per cent of citric acid, based on its sulphate content figured as $MgSO_4.7H_2O$. The increase in volume of the porous mass was 50 per cent.

*Example 8*

To show the effect of an agent to retard the setting of the cement (e. g. borax), the dry mix of Example 5 was used, with which was incorporated 0.5 per cent of 48-mesh particles of magnesium, 0.4 per cent of an emulsified oil and 3.0 per cent of borax, and the whole was gaged with a 22° Bé. magnesium chloride solution. The increase in volume of the hardened porous mass was 80 per cent.

As already pointed out, other magnesium alloys in finely divided form, as well as other emulsifying agents or retarders, may be employed without departing from the scope and principle of the invention. Likewise the proportions of ingredients in the dry mix, and the type of filler, may be varied in accordance with the known state of the art. Concisely stated, therefore, the invention comprises a plastic magnesia cement, whether an oxychloride or oxysulphate cement, with which is incorporated a relatively small amount of finely divided magnesium or magnesium alloy, either with or without the further addition of an emulsifying agent or of a retarder or both.

This application is a continuation-in-part of my prior application, Serial No. 257,105, filed February 25, 1928.

In the claims, the term "magnesium" is understood to include magnesium alloys, by which is meant any alloys of magnesium with other metals, containing a substantial percentage of magnesium.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making porous magnesia cement mixtures of the class consisting of magnesium oxychloride and magnesium oxysulphate cements which comprises adding a relatively small amount of finely divided magnesium to the plastic cement mass.

2. The method of making porous magnesia cement mixtures of the class consisting of magnesium oxychloride and magnesium oxysulphate cements which comprises adding a relatively small amount of finely divided magnesium and a gas-entraining agent to the plastic cement mass.

3. The method of making porous magnesia cement mixtures of the class consisting of magnesium oxychloride and magnesium oxysulphate cements which comprises adding a relatively small amount of finely divided magnesium, a gas-entraining agent and a retarder to the plastic cement mass.

4. The method of making porous magnesia cement mixtures of the class consisting of magnesium oxychloride and magnesium oxysulphate cements which comprises incorporating in the plastic cement mass from .05 to 2.0 per cent, based on the weight of dry constituents, of particles of magnesium having a fineness of from 10 to 100 mesh.

5. The method of making porous magnesia cement mixtures of the class consisting of magnesium oxychloride and magnesium oxysulphate cements which comprises incorporating in the plastic cement mass a gas-entraining agent and from .05 to 2.0 per cent, based on the weight of dry constituents, of particles of magnesium having a fineness of from 10 to 100 mesh.

6. The method of making porous magnesia cement mixtures of the class consisting of magnesium oxychloride and magnesium oxysulphate cements which comprises incorporating in the plastic cement mass a gas-entraining agent, a retarder and from .05 to 2.0 per cent, based on the weight of dry constituents, of particles of magnesium having a fineness of from 10 to 100 mesh.

7. A cementitious mixture comprising a plastic magnesia cement mass of the class consisting of magnesium oxychloride and magnesium oxysulphate cements to which has been added a relatively small amount of finely divided magnesium.

8. A cementitious mixture comprising a plastic magnesia cement mass of the class consisting of magnesium oxychloride and magnesium oxysulphate cements to which has been added a relatively small amount of finely divided magnesium and a gas-entraining agent.

9. A cementitious mixture comprising a plastic magnesia cement mass of the class consisting of magnesium oxychloride and magnesium oxysulphate cements to which has been added a relatively small amount of finely divided magnesium, a gas-entraining agent and a retarder.

10. A cementitious mixture comprising magnesia, a soluble magnesium salt of the class consisting of magnesium chloride and magnesium sulphate, water and a relatively small amount of finely divided magnesium.

11. A cementitious mixture comprising magnesia, a soluble magnesium salt of the class consisting of magnesium chloride and magnesium sulphate, water, a relatively small amount of finely divided magnesium and a gas-entraining agent.

12. A cementitious mixture comprising magnesia, a soluble magnesium salt of the class consisting of magnesium chloride and magnesium sulphate, water, a relatively small amount of finely divided magnesium, a gas-entraining agent and a retarder.

LEROY C. STEWART.